(12) United States Patent
Pointet

(10) Patent No.: US 6,588,895 B2
(45) Date of Patent: Jul. 8, 2003

(54) SPECTACLES FRAME

(75) Inventor: Patrice Marie Pointet, Veyziat (FR)

(73) Assignee: BAB Sports S.A., Sierre (CH)

( * ) Notice: Subject to any disclaimer, the term of this patent is extended or adjusted under 35 U.S.C. 154(b) by 0 days.

(21) Appl. No.: 10/156,651

(22) Filed: May 28, 2002

(65) Prior Publication Data

US 2002/0191151 A1 Dec. 19, 2002

(30) Foreign Application Priority Data

May 28, 2001 (FR) .............................. 01 06939

(51) Int. Cl.[7] .................................................. G02C 5/14
(52) U.S. Cl. ........................................ 351/120; 351/123
(58) Field of Search ................................. 351/111, 119, 351/120, 121, 123

(56) References Cited

U.S. PATENT DOCUMENTS

| | | | |
|---|---|---|---|
| 4,804,260 A | | 2/1989 | Anger |
| 4,820,034 A | * | 4/1989 | Anger .......................... 351/123 |
| 5,623,322 A | * | 4/1997 | Hirschman et al. ......... 351/119 |
| 5,631,718 A | | 5/1997 | Markovitz et al. |
| 5,760,867 A | | 6/1998 | Pernicka et al. |
| 5,790,229 A | | 8/1998 | Poloni et al. |
| 6,293,673 B1 | * | 9/2001 | Hirschman et al. ......... 351/123 |
| 6,318,858 B1 | * | 11/2001 | Siani ........................... 351/123 |

FOREIGN PATENT DOCUMENTS

| | | |
|---|---|---|
| EP | 0 698 801 A | 2/1996 |
| WO | WO 96/248877 A | 8/1996 |
| WO | WO 98 02770 A | 1/1998 |

* cited by examiner

*Primary Examiner*—Huy Mai
(74) *Attorney, Agent, or Firm*—Bugnion S.A.; John Moetteli

(57) ABSTRACT

The present invention relates to a spectacles frame (1), particularly for sports spectacles, allowing the inclination of the frame with respect to the user's face to be adjusted to suit his build. It comprises, for each side (2), a part (3) articulated by one of its ends to the free end (21) of the side (2), means (4, 5) allowing the angular position of said part (3) to be varied with respect to the side (2). This part (3) itself is designed to rest on the upper part of the user's ear. By varying the angular position of the part (3) with respect to the side (2), the inclination of the frame with respect to the user's face is varied.

3 Claims, 1 Drawing Sheet

SPECTACLES FRAME

BACKGROUND OF THE INVENTION

The present invention relates to a spectacles frame, particularly for sports spectacles.

When a pair of spectacles is purchased, aside from the dimensions of the frame, it is also necessary to adjust the inclination of that part of the frame that contains the lenses with respect to the sides to tailor it to the build of the user's face. Customarily, this work is performed by the vendor, either by deforming the inclination of the sides with respect to the frame containing the lenses, or by deforming the posterior part of the sides in order to obtain the same result, or, in certain cases, by acting on the hinge that connects the sides to the frame.

These various adjustments have to be made by the optician or the vendor who needs to have appropriate tools and also an in-depth knowledge of the materials used, so as not to damage the frame. In self-service sales outlets it is practically impossible to obtain such a service.

SUMMARY OF THE INVENTION

The purpose of the present invention is to propose spectacles frames that can be adjusted, particularly in terms of the inclination of that part of the frame which carries the lenses, by the user himself without having to use special-purpose tools.

The frame according to the present invention is one wherein said curved-arc-shaped part is articulated by one of its ends to the free end of the side about an axis approximately perpendicular to the hinge of the side, and the means allowing the angular position of said curved-arc-shaped part to be adjusted with respect to the side is a series of mating male and female elements situated on the two articulated ends of the side and of said curved-arc-shaped part, respectively.

The advantage of this device is that the inclination is adjusted directly by the user by altering the angular position between said curved parts and the sides of the spectacles without having to use specialist tools.

According to a preferred alternative form, the circular-arc-shaped part has, at its free end, an additional thickness equipped with a housing designed to accommodate the free end of the side and to limit the angular travel of the two ends thus articulated.

Finally, according to the embodiment achieved, the end of each side is assembled with each of said curved-arc-shaped parts by a peg that passes at least partially through the two elements and is caught in place.

The invention will be described in greater detail with the aid of the appended drawing.

DESCRIPTION OF THE PREFERRED EMBODIMENT

Figure 1:
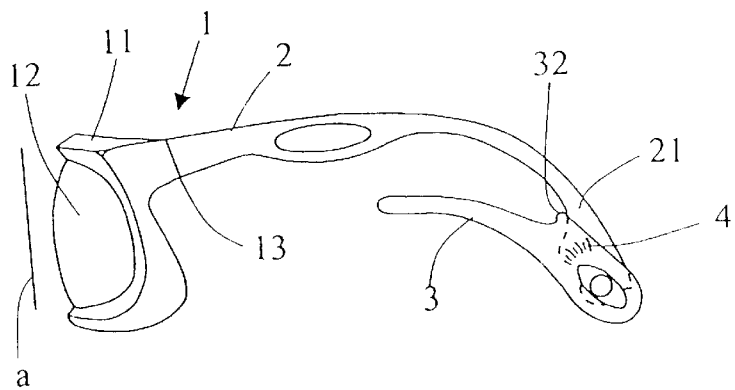
FIG. 1 is a side view of a frame according to the invention.
Figure 2:
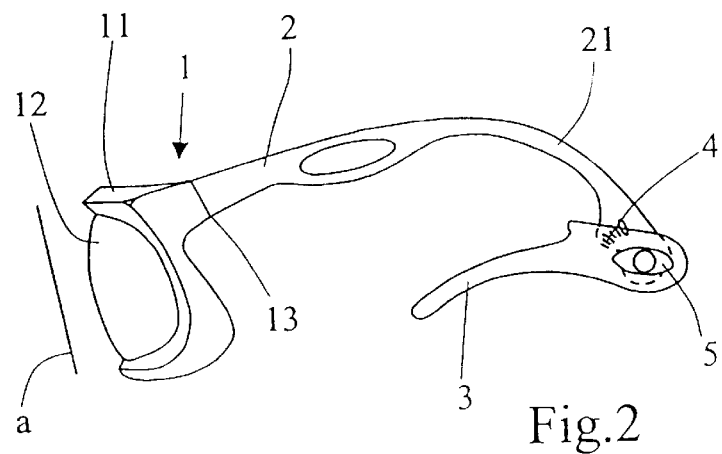
FIG. 2 is a view similar to the previous one, the angular position between the curved element and the side having been changed.

A spectacles frame 1 is depicted in FIGS. 1 and 2 and comprises the anterior part of the frame 11 supporting the lenses 12, sides 2 articulated to the frame by hinges 13. At the free part 21 of each side 2 is articulated a part 3 in the shape of an arc of a curve. Mating male and female elements 4 located on the end of the side 21 and on the end of the part 3, respectively, allow the part 3 and the side 2 to be given a relative angular position. In this instance, we have illustrated three elements 4, although this number may vary. The male elements become lodged in the female elements and it is possible to move from one position to another by applying force to the side 2 of the element 3 in order to change the angular position.

By the combination of the two FIGS., 1 and 2, it can be seen that by changing the angle between the side 2 and the part 3 the inclination of the plane of the frame, illustrated by a line a, can be varied.

Figure 3:
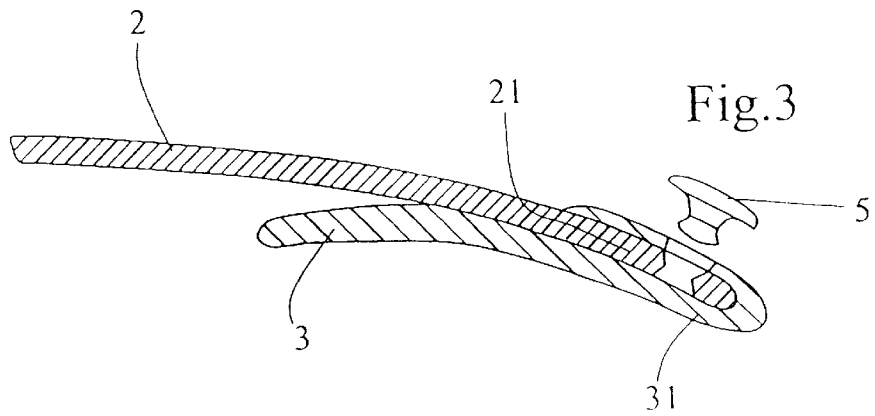
FIG. 3 is a part view in cross section of the articulated ends of a side with the curved element.

As depicted in FIG. 3, the element 3 is equipped at its articulation end with an additional thickness 33 equipped with a slot in which the end 21 of the side 2 is lodged. This housing delimited by walls limiting the maximum angular travel of the elements as depicted in FIGS. 1 and 2. In fact, FIG. 1 shows the end 32 of the element 3 in abutment against the side of the spectacles of the side 2 preventing any reduction in the angle between the two elements, whereas another wall, not visible in drawing 2, prevents the angle between the two elements from being made any wider, as depicted in FIG. 2.

To assemble the two elements 3 and 2, use is made of a peg in the form of a press stud 5 which becomes lodged in a frustoconical hole formed between part of the element 3 and the side 2. Of course, this is merely one possible embodiment, and other means of assembly may be used depending on the materials also used.

Frames of this type, particularly proposed for sports spectacles, are made of a synthetic material, although the invention may be embodied using any frame made of any material.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed:

1. A spectacles frame, particularly for sports spectacles, each side of the frame being equipped with means allowing the inclination of the frame with respect to the user's face to be adjusted to suit his build, comprising a part in the form of an arc of a curve fixed by one of its ends to the free end of the side, means allowing the angular position of said curved-arc-shaped part to be varied with respect to the side, said curved-arc-shaped part extending from the free end of each side toward the anterior part of each side, and it is designed to rest on the upper part of the user's ear, wherein said curved-arc-shaped part is articulated via one of its ends to the free end of the side about an axis approximately perpendicular to the hinge of the side, and the means allowing the angular position of said curved-arc-shaped part to be adjusted with respect to the side is a series of mating male and female elements situated on the two articulated ends of the side and of said curved-arc-shaped part, respectively.

2. The frame as claimed in claim 1, wherein the curved-arc-shaped part has, at its articulation end, an additional thickness equipped with a housing designed to accommodate the free end of the side and to limit the angular travel of the two ends thus articulated.

3. The frame as claimed in claim 2, wherein the end of each side is assembled with said circular-arc-shaped part by a peg that passes at least partially through the two elements and is caught in place.

* * * * *